July 15, 1969 J. J. HILL 3,456,162

ELECTRONIC DEVICE FOR SEPARATING VOICE FROM FREQUENCY CONTROL SIGNALS

Filed Sept. 30, 1966

INVENTOR.
JAMES J. HILL
BY
Lloyd J. Andres

United States Patent Office 3,456,162

Patented July 15, 1969

3,456,162

ELECTRONIC DEVICE FOR SEPARATING VOICE FROM FREQUENCY CONTROL SIGNALS

James J. Hill, Hialeah, Fla., assignor to World-Wide Electronics, Inc., Miami, Fla., a corporation of Florida Filed Sept. 30, 1966, Ser. No. 583,322
Int. Cl. H01h 47/20, 51/32; H02b 1/04
U.S. Cl. 317—138 1 Claim

ABSTRACT OF THE DISCLOSURE

In a dual channel communication circuit for operating a relay, one channel is responsive to a human voice and the other channel to a constant frequency signal to turn the relay on and off respectively.

This invention relates in general to electronic communication circuits and more particularly to a means for coordinating and amplifying a constant frequency component and a voice component of a transmission circuit for operating separate control circuits.

Previous voice operated circuits are commonly constructed entirely independent of other control circuits, resulting in excessive complication and high cost and are often troublesome due to interaction of separate signals.

The present invention overcomes the above objections and disadvantages by the provision of an electronic assembly constructed with inter-connected circuits in common for providing independent relay voice operated control and relay constant frequency control from a single communication transmission circuit.

A principal object of the invention is the provision of a transistorized circuit device responsive to a single communication circuit for separating voice from frequency transmission for independent different control operations.

Another object of the invention is the provision of a dual electronic channel device for connection to a communication circuit for operating an external circuit by means of a modulated signal transmitted by said communication circuit on one portion of said dual channel for operating said external circuit to an "on" position for a predetermined period, and a second portion of said dual circuit for receiving a constant frequency signal for transmitting from said communication circuit for operating said external circuit to an "off" position when said second channel is energized.

Another object of the invention is the provision of a transistorized dual control device and dual circuit therefor on a printed board adapted for quick replacement by plug-in construction.

A further object of the invention is the provision of a typical transistorized relay control circuit means for connection to a communication circuit and responsive only to the human voice for energizing other devices, such as a tape recorder, and including a filter circuit integrated therewith responsive only to one of a group of predetermined audio frequencies when transmitted by the communications circuit for controlling another circuit, such as de-energizing the aforesaid tape recorder.

These and other objects and advantages in one embodiment of the invention are shown and described in the following specification and drawing, in which.

It is to be understood that the embodiment of the device to be hereinafter described is intended to be applied to a conventional dial telephone circuit for operating recording apparatus, however, the device has many other uses where speech and frequency discrimination is required.

Figure 1:
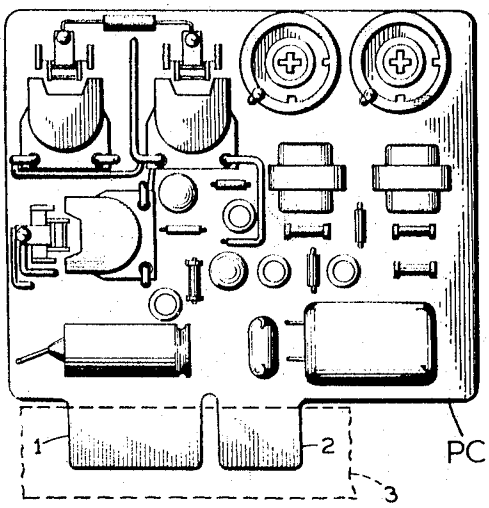
FIG. 1 is a plug-in type printed circuit board on the top of which are all of the electric elements of the device.

Referring to FIG. 1, all of the electronic elements comprising dual channels are mounted on the top side of a PC board, as shown, which has projecting therefrom tabs 1 and 2 which are provided to plug into a multi-contact receptacle 3, illustrated by dotted lines.

Figure 2:
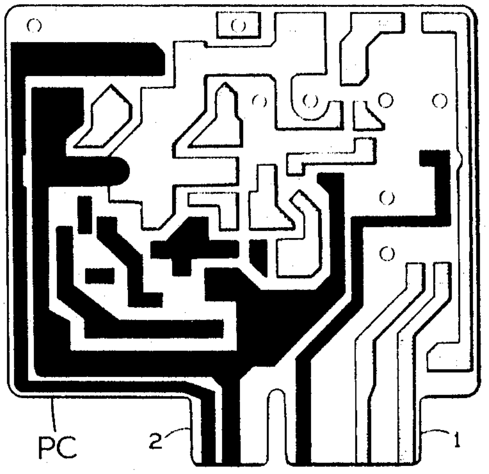
FIG. 2 is a bottom view of the board shown in FIG. 1, showing the printed circuit connections to the elements shown in FIG. 1.

Referring to FIG. 2, the bottom side of the PC board shows an integrated dual printed circuit thereon for completing the circuits to the elements shown in FIG. 1. The portions of the printed circuit, shown in solid lines, are connected to the frequency control elements to be hereinafter described, whereas the portion of the printed circuit shown in outline relates to the speech control elements which comprise a well known voice operated circuit commonly referred to as a VOX circuit.

Figure 3:
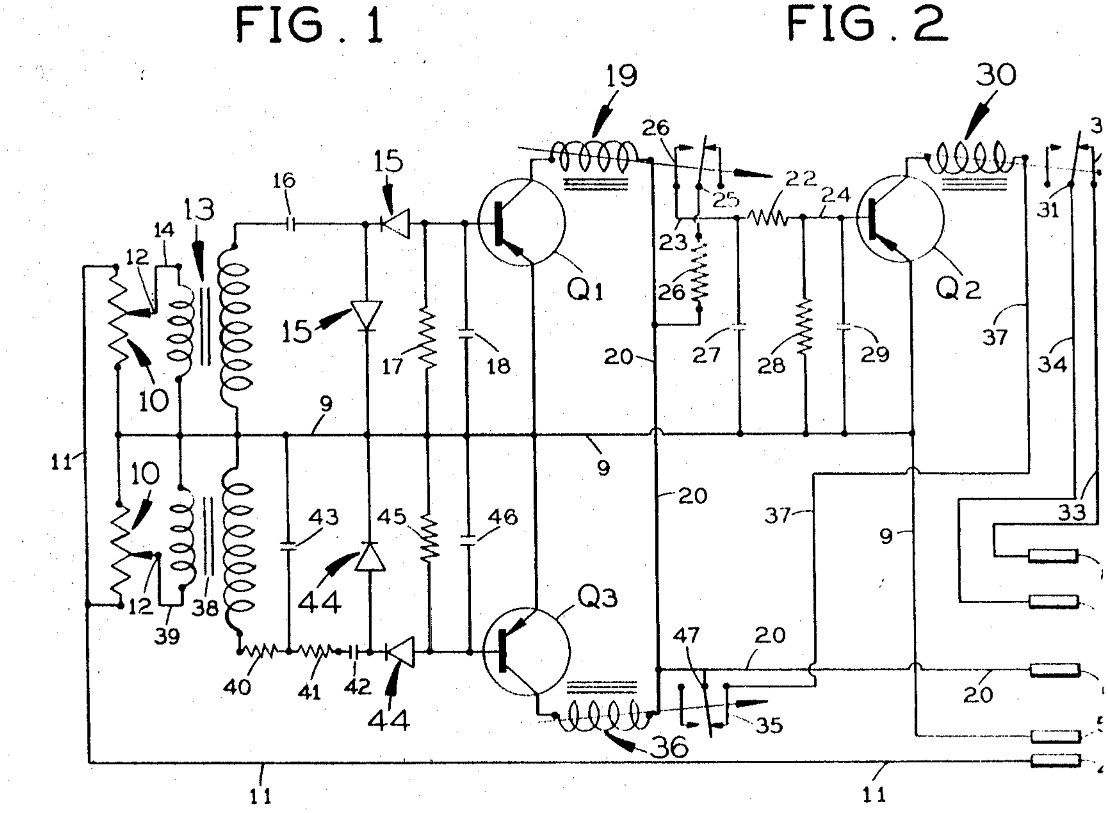
FIG. 3 is a schematic circuit diagram of the elements shown in FIGS. 1 and 2.

FIG. 3 shows the dual schematic circuit used in FIGS. 1 and 2 which comprises a pair of audio input terminals 4 and 5 with terminals 5 and 6 comprising the positive and negative D.C. input terminals, respectively. Terminals 7 and 8 are control terminals, the function of which will be hereinafter described. Terminal 5 is connected to a conductor 9, which is common to both the speech and frequency circuits and all of the elements in the device are connected to the negative side of the source of D.C. power.

A pair of voltage dividing input potentiometers 10—10 have a common connection to each resistance thereof connected to conductor 9 and the remaining terminal of each connected to a conductor 11 which is connected to terminal 4. Thus, substantially half of any input potential applied to terminals 4 and 5 is impressed across the resistance portion of each potentiometer.

It is to be understood that the elements above the common conductor 9 relate to a well known VOX circuit which will be briefly described as follows. The slider terminal 12 of the potentiometer is connected to one terminal of the primary of a step-up transformer 13 by a conductor 14 and the remaining terminal is connected to the common conductor 9. One terminal of the secondary of the transformer 13 is connected to each terminal of a pair of solid state diodes 15—15 of opposite polarity through a capacitor 16. The remaining terminals of opposite polarity of the diodes are connected to common conductor 9 and the base of PNP transistor $Q_1$, respectively, for amplifying the incoming signal. The base of $Q_1$ is biased to conductor 9 by resistor 17 and capacitor 18 in conventional manner. The emitter of $Q_1$ is connected to conductor 9, as shown.

A fast acting circuit closing relay 19, having SPDT contacts, has one terminal of the coil thereof connected to the collector of $Q_1$. The opposite terminal thereof is connected to terminal 6 via conductor 20. The normally open contact 21 of relay 19 is connected to the base of a time delayed transistor $Q_2$ through a resistor 22 via conductors 23 and 24, respectively. The normally open pole 25 is connected to conductor 20 through a resistor 26, as shown.

A capacitor 27 is connected between conductor 23 and conductor 9. A resistor 28 and capacitor 29 are connected between conductor 24 and conductor 9, which circuit completes an isolation and time delay function of transistor $Q_2$. An operational relay 30, responsive to time delay, is provided with a SPDT contact with normally closed pole 31 and contact 32 connected to terminals 7 and 8, respectively, by conductors 33 and 34.

At this point it is to be noted that when a predetermined speech voltage is applied to the primary of transformer 13 it will be full wave rectified by diode 15—15 into D.C. components and rapidly operate relay 19, which in turn will rapidly operate the operational relay 30. However, predetermined delay periods in speech transmission will not result in the opening of the control relay 30 by virtue of the predetermined time delay circuit of the capacitors and resistors shown and described in the isolation-delay portion of the circuit.

The remaining terminal of the time delay relay 30 connects to a normally closed contact 35 of a frequency relay 36 through conductor 37.

This completes the speech operated circuit which likewise responds to other periodic modulation applied to terminals 4 and 5 from a communications circuit, not shown, which results in opening of pole 31 from contact 32 which will remain open for predetermined pauses in the periodic modulation and through terminals 7 and 8 to which other electronic means connected thereto (not shown) may be used to energize a tape recorder or other signal recording or responsive devices.

When a predetermined constant A.C. frequency signal is applied to terminals 4 and 5 and impressed upon the potentiometers 10—10, the VOX will not operate because the circuit constants will not pass the signal to the operational relay 30. However, pre-setting of the slide terminal 12 will energize the primary of transformer 38 through conductor 39 and conductor 9 connected thereto. One terminal of secondary of transformer 38 is connected through series connected resistors 40 and 41 and through a capacitor 42, not shown. The remaining terminal of transformer secondary is connected to conductor 9. A capacitor 43 is connected to the junction of resistors 40 and 41, thus providing a T filter for passing a signal of predetermined frequency, such as a selected signal between 300 and 800 Hz. The pair of solid state diodes 44—44 are connected in opposite polarity to the remaining terminal of capacitor 42 with the opposite terminals thereof connected to the base of transistor $Q_3$ and conductor 9, respectively, thus providing a full wave rectifier for energizing transistor $Q_3$ with the rectified frequency signal for amplification. A resistor 45 and a capacitor 46 are connected to the base of $Q_3$ and conductor 9 for conventional bias purposes and the emitter element of $Q_2$ is also connected to conductor 9. One terminal of the control relay 36 is connected to the collector element of $Q_3$ and the remaining terminal connected to conductor 20, as shown. The normally closed pole 47 of relay 36 is also connected to conductor 20.

In operation and assuming that the relays are de-energized, as shown in FIG. 3, then when terminals 4 and 5 are connected to a communication circuit or other periodically modulated signal circuit, then upon a proper pre-adjustment of the upper potentiometer 10 the modulated signal is rectified by diodes 15 and will operate relays 19 and 30 substantially simultaneously to open pole 31 from contact 32 and thus operate a control circuit, not shown. The contact 32 will remain de-energized with the pole 31 thereof remaining open during predetermined periods between modulations or elements of speech by virtue of the time delay means previously described.

When a constant predetermined frequency is impressed on terminals 4 and 5 by the communications circuit, then by pre-adjustment of the lower potentiometer 10 the T filter will permit the passage of the secondary voltage of transformer 38 to the diodes 44 and thus full wave rectification will be impressed upon the base of transistor $Q_3$, which in effect is an amplifier band pass filter, which will energize control relay and move pole 47 thereof into its open position from contact 35, thus de-energizing relay 30 and permitting pole 31 to move into contact with contact 32, thus overcoming the time delay imposed on relay 30 and operating a circuit, not shown, to terminals 7 and 8 for operating other electronic elements, not shown, such as de-energizing a tape recorder.

It is to be understood that those skilled in this art can apply appropriate values to the elements previously described to function for particular frequencies and predetermined time delays.

The compact, relatively low-cost plug-in construction is advantageous in that the quick detachment of the entire device for change in the same devices having different frequency response or other operational characteristics within the construction described.

This invention comprehends modifications in construction within the teachings and scope of the above specification.

Having described my invention, I claim:

1. In an electric control device for operating an electric means of the character described, a communication circuit for conducting periodic speech signals and a predetermined band of audio frequency signals, an independent circuit for operating said electric means, a first and second control circuit means having the inputs thereof adapted for connection to said communication circuit, said first control circuit means constructed and adapted to transmit speech signals from said communication circuit when connected thereto, said first control circuit means terminating in a first magnetic relay means including contacts for movement from a normally open to a closed position when said relay means is energized by said first circuit means, said contacts connected to said independent circuit for completing a circuit thereto when in said closed position, a time delay network connected in said first circuit means for energizing said relay means for a predetermined extended period of time beyond the time said circuit means is normally energized by a speech sequency from said communication circuit, said second control circuit means including a filter network responsive to a predetermined band of audio frequency signals when connected to said communication circuit and including a transistor amplifier means for amplifying said band of frequencies, a solid state rectifier in said circuit between said filter network and said amplifier means for converting said band of audio signals into corresponding unidirectional pulses, said circuit terminating in a second magnetic relay means responsive and energized by said rectified and amplified band of frequency signals having contacts thereof movable from a normal operative to a non-operative position when said second relay is energized, a limiting circuit connected between said contacts of said second relay means and said first relay means for de-energizing the latter when said second relay means is operated, a source of electric energy connected to said second circuit means for energizing said transistor means whereby the transmission of said band of frequency signals in said second circuit will de-energize said independent circuit and de-energize said first relay means during said extended period of time.

(References on following page)

References Cited

UNITED STATES PATENTS

| | | | |
|---|---|---|---|
| 2,513,342 | 7/1950 | Marshall | 317—138 |
| 2,762,922 | 9/1956 | Lax | 317—138 X |
| 2,780,724 | 2/1957 | Fickett | 340—171 X |
| 3,133,992 | 5/1964 | Dickman | 179—100.1 X |
| 3,168,738 | 2/1965 | Curll | 317—138 X |
| 3,339,117 | 8/1967 | Fisher | 317—101 |

FOREIGN PATENTS

| | | |
|---|---|---|
| 117,525 | 9/1943 | Australia. |

JOHN F. COUCH, Primary Examiner
W. H. BEHA, Jr., Assistant Examiner

U.S. Cl. X.R.

179—100.1; 317—101, 147